United States Patent [19]
Benson

[11] Patent Number: 5,935,246
[45] Date of Patent: Aug. 10, 1999

[54] ELECTRONIC COPY PROTECTION MECHANISM USING CHALLENGE AND RESPONSE TO PREVENT UNAUTHORIZED EXECUTION OF SOFTWARE

[75] Inventor: Glenn Stuart Benson, Munich, Germany

[73] Assignee: International Computers Limited, London, United Kingdom

[21] Appl. No.: 08/838,620

[22] Filed: Apr. 11, 1997

[30] Foreign Application Priority Data

Apr. 26, 1996 [GB] United Kingdom ............... 9608696

[51] Int. Cl.⁶ .................................................. G06F 12/14
[52] U.S. Cl. ........................... 713/200; 713/201; 713/202
[58] Field of Search ................................ 395/186, 387, 395/860, 187.01; 380/25, 4, 21, 23, 30; 713/200

[56] References Cited

U.S. PATENT DOCUMENTS

| | | | |
|---|---|---|---|
| 4,558,176 | 12/1985 | Arnold et al. | 178/22.08 |
| 4,926,480 | 5/1990 | Chuam | 380/23 |
| 4,947,430 | 8/1990 | Chaum | 380/25 |
| 5,109,413 | 4/1992 | Comerford et al. | 380/4 |
| 5,146,575 | 9/1992 | Nolan, Jr. | 395/425 |
| 5,224,163 | 6/1993 | Gasser et al. | 380/30 |
| 5,315,657 | 5/1994 | Abadi et al. | 380/25 |
| 5,371,794 | 12/1994 | Diffie et al. | 380/21 |
| 5,436,972 | 7/1995 | Fischer | 380/25 |
| 5,568,552 | 10/1996 | Davis | 380/4 |
| 5,724,425 | 3/1998 | Chang et al. | 380/25 |

FOREIGN PATENT DOCUMENTS

WO 88/05941  8/1988  WIPO.

OTHER PUBLICATIONS

Davis, "Cryptographic Randomnes From Air Turbulence In Disk Driver", Advances in Cryptology, Conference 14, Aug. 21, 1994, pp. 114–120.

*Primary Examiner*—Hassan Kizou
*Assistant Examiner*—Rijue Mai
*Attorney, Agent, or Firm*—Lee, Mann, Smith, McWilliams, Sweeney & Ohlson

[57] ABSTRACT

A copy protection mechanism for protecting software against copying, consists of a challenge mechanism embedded in each protected item of software. The challenge mechanism has no access to the customer's private keying material. In operation, the challenge mechanism sends a random challenge to the customer's signature server. The signature server signs the challenge, using the customer's private keying material and then returns the signed challenge to the challenge mechanism. The challenge mechanism then verifies the signed challenge, using the customer's public keying material, and prohibits the customer from using some or all of the protected item of software unless the verification is successful. The mechanism permits every customer to receive an identical copy of the copy protected program with the embedded challenge mechanism.

25 Claims, 3 Drawing Sheets

ELECTRONIC COPY PROTECTION MECHANISM USING CHALLENGE AND RESPONSE TO PREVENT UNAUTHORIZED EXECUTION OF SOFTWARE

BACKGROUND TO THE INVVENTION

This invention relates to electronic copy protection mechanisms for protecting software against unauthorized copying.

The Business Software Alliance estimates the 1995 financial losses attributed to software piracy as US$8.1 Billion for business application software and US$15.2 Billion for all software. Solutions have been proposed in two areas: (i) improved Intellectual Property Rights (IPR) legislation, and (ii) enhanced electronic copy protection (ECP) mechanisms. IPR legislation and enforcement are improving in many countries, but there are still significant difficulties in other parts of the world. As a result, some vendors are currently reassessing ECP.

It is desirable for any ECP mechanism to satisfy the following requirements.

- The ECP mechanism should prohibit unauthorized users from executing copy protected software.
- The ECP mechanism should not prohibit the user from making backups.
- The ECP mechanism should make only standard hardware and software assumptions. For example, although hardware dongles provide excellent copy protection services, many vendors do not wish to limit the sale of the software to the collection of users who own or are willing to install a dongle.
- The ECP mechanism should have minimal impact upon the user interface. The visible impact should be limited to the customer's initial login to the operating system and/or smart card. Subsequent impact upon the user interface should be relegated to relatively minor performance concerns.
- The ECP mechanism should not limit execution of the copy protected software to a limited collection of machines. When a customer legitimately purchases software, the customer should be able to execute the software on any machine regardless of ownership. The customer should optionally be able to authorize simultaneous execution of the software on multiple machines.
- The ECP mechanism should have no required network dependencies in order to execute an already purchased copy protected program.
- The vendor should be permitted to distribute an identical version of the copy protected software to all users. This requirement permits the copy protected software to be distributed through normal channels such as, for example, CD-ROMs, floppy disks, or network bulletin boards.
- It should be excessively difficult and/or computationally infeasible for a potential software pirate to circumvent the copy protection mechanism without modifying the copy protected program. This requirement serves as an important virus-protection measure because a digital signature supplied by the vendor would not validate if a pirate distributes a modified version of the original program.
- The ECP mechanism should not compromise any of the customer's private keying material. In particular, the ECP mechanism should not disclose the customer's private keying material to the vendor, any program produced by the vendor, or any simple Trojan horse program. While the primary functionality of copy protection is to protect the software vendor, one must not do so at the expense of the customer.
- The ECP mechanism should be available in either a software-only version or a hardware-assisted (smart card) version, to assure widespread market acceptance.
- The least time consuming attack by a potential software pirate should be byte-code disassembly of the copy protected software. In order to thwart the copy protection mechanism, the pirate must remove or change the ECP. Choudhury et al. ["Copyright Protection for Electronic Publishing over Computer Networks", available as at Mar. 27, 1996 on Word Wide Web at http://ftp.research.att.com/dist/anoncc/copyright.epub.ps.Z] propose a mechanism in which a protected document can be viewed only via a specially configured viewer program, which allows a user to view the document only if the user supplies the viewer with the user's private keying material. This deters the user from distributing unauthorized copies of the viewer program, since that would require the user to divulge his or her private keying material to others. However, because Choudhury's mechanism requires that the viewer program obtain access to the customer's private keying material, it breaks one of the requirements listed above. Furthermore, Choudhury's mechanism may not be used in conjunction with a smart card that is configured to avoid releasing private keying material.

The object of the present invention is to provide an improved ECP mechanism that is able to satisfy the above requirements.

The ECP mechanism of the present invention makes use of asymmetric cryptography, also known as public key cryptography. In asymmetric cryptography, each user has public keying material and private keying material. Each user may post his or her public keying material to a publicly accessed directory without compromising the corresponding private keying material. Normally, the user guards the private keying material as a close secret. Using the RSA asymmetric encryption algorithm, for example, a pair of users may encrypt and then subsequently decrypt a message using either of two methods: (i) encrypt using the public keying material and decrypt using the private keying material; or (ii) encrypt using the private keying material and decrypt using the public keying material. Two examples are presented below.

Secret message: A user, Alice, posts her public keying material to a well-known directory or bulletin board. A second user, Bob, wishes to send a confidential message to Alice. Bob encrypts the message using Alice's public keying material and sends the encrypted message to Alice. Since Alice is the only user with access to the corresponding private keying material, only Alice may decrypt the message to discover its original content.

Digital signature: A digital signature is an electronic analog of a handwritten signature. After posting her public keying material, Alice encrypts a message using the private keying material. Since anyone may access the public keying material, there is no message secrecy. However, since Alice is the only user with access to the private keying material, no one else can "forge Alice's signature" by performing the encryption. Any user may validate Alice's signature using the public keying material.

Both examples depend upon the fact that Alice closely guards her private keying material. Otherwise, the cryptographic system may neither guarantee secrecy nor ensure signature validity. The best known mechanism for protecting one's private keying material is through the use of a smart card. In this case, the smart card is a device with no interface for releasing private keying material (in a non-cryptographically protected form).

Although smart cards provide the best protection, social factors of electronic commerce may provide a role in ensuring private keying material protection. One of the significant difficulties associated with asymmetric encryption services is authentication. For example, if Alice posts her public keying material to a public directory, then how does Bob assess validity? That is, a pirate may attempt to masquerade as Alice but post the pirate's keying material. Some commercial organizations are beginning to provide solutions to this problem by acting as Certification Authorities (CA). For (possibly) a fee, the CA solicits identifying material from potential customers such as a driver's license or passport. After validating the identifying material, the CA posts the customer's public keying material to a public directory, and the CA signs a certificate that holds the customer's public keying material. Standardized services, for example, X.500 may be adopted to help facilitate the use of directories that contain public keying material.

Once a user posts his or her public keying material to the CA, the user will probably make an extensive effort to protect his or her private keying material. In this case, if the user's private keying material were to become unknowingly compromised, then the user would have cause for significant concern because networked vendors may authorize electronic commerce transactions based on the information found in the public directory.

SUMMARY OF THE INVENTION

According to the invention there is provided a computer system comprising a copy protection mechanism for protecting software against copying, the copy protection mechanism comprising challenge means associated with a protected item of software, and response means in which a customer's private keying material is securely stored, wherein:

(a) the challenge means has no access to the customer's private keying material;
(b) the response means comprises means for signing information using the customer's private keying material and then returning the signed information to the challenge means, and
(c) the challenge means comprises means for verifying said signed information, using the customer's public keying material, and for prohibiting the customer from using some or all of said item of software unless said verification is successful.

DESCRIPTION OF AN EMBODIMENT OF THE INVENTION

One ECP mechanism in accordance with the invention will now be described by way of example with reference to the accompanying drawings.

Purchasing Protocol

Figure 1:
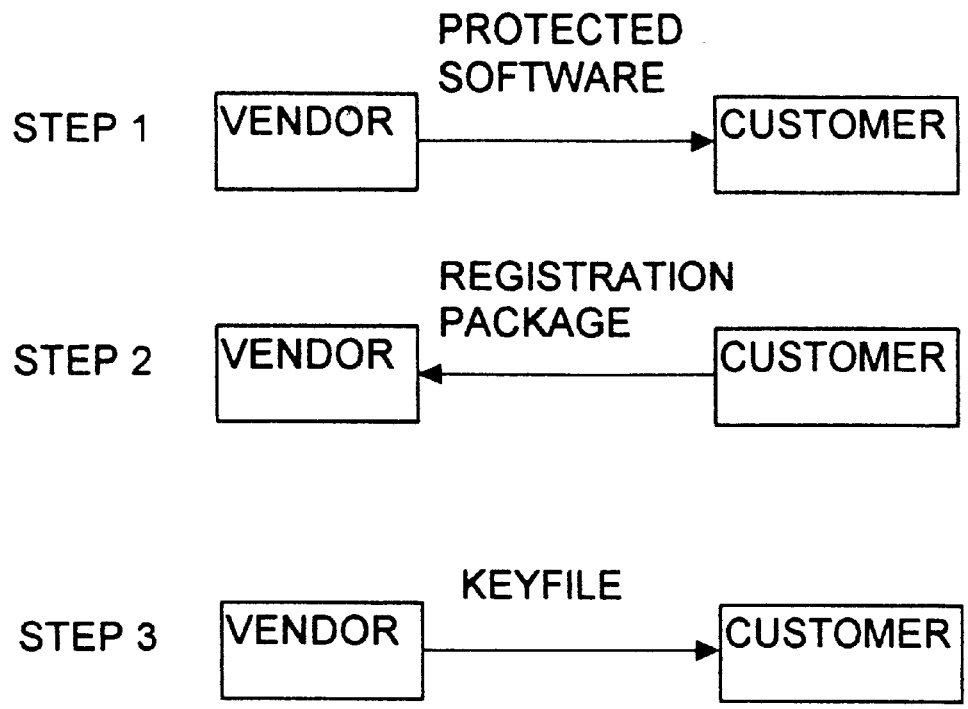
FIG. 1 is a flow diagram of a purchasing protocol used when a customer wishes to purchase software that is protected by an ECP mechanism in accordance with the invention.

FIG. 1 shows a purchasing protocol used when a customer wishes to purchase software that is protected by an ECP mechanism in accordance with the invention. It is assumed that each party (i.e. the vendor and each potential customer) has its own public and private keying material. Each party makes its public keying material available to other parties, but keeps its private keying material secret.

In step 1, the customer obtains the protected software from a vendor. The customer may get the software, for example, on a floppy disk or CD-ROM at a PC store. Alternatively, the customer may download the software from a network bulletin board. A challenge mechanism, to be described later, is embedded in protected software in such a way that a potential attacker cannot easily separate the challenge mechanism from the protected program. The attacker would need to disassemble the code and to manually remove the challenge mechanism. The challenge mechanism has the vendor's public keying material embedded in it. As will be described, the challenge mechanism prevents the user from running the software at this stage.

In step 2, the customer sends a registration package to the software vendor, for example by electronic mail. This registration package contains a reference to a public directory that holds the customer's public keying material.

In step 3, the software vendor embeds the customer's public keying material into a keyfile and sends the keyfile to the customer, for example by electronic mail. Once the customer installs the keyfile, the ECP mechanism permits the customer to execute the software.

The creation of the keyfile by the vendor is performed by a keyfile generator, which is a program that executes at the vendor's facility. The vendor must take care to guard this program because it accesses the vendor's private keying material. In use of the keyfile generator, an operator enters the following information:

Vendor name: The name of the vendor's company.
Vendor password: The password that unlocks the vendor company's private keying material (decrypt the private keying material using the password). Company employees who do not know the password cannot generate keyfiles.
Customer name: The name of a customer for whom to generate a keyfile. The name indexes into a database of public keying material.
Keyfile name: The name of a new keyfile.

After obtaining this information, the keyfile generator builds a keyfile, containing the customer's public key. The keyfile appears to the customer as a completely random sequence of values. Building of the keyfile involves the following operations. First, the keyfile generator creates a file and inserts the customer's public keying material into the file, along with thousands of decoy bits. In the present example, each keyfile contains approximately 480,000 decoy bits. This number of bits represents a significant amount of decoy material, and can fit into a standard e-mail message.

Each keyfile stores the customer's public keying material in a different location. Additionally, each keyfile has encrypted customer information embedded in it without disclosing the required encryption key. This encrypted customer information permits a software vendor to easily identify the owner of a keyfile in the event that the keyfile appears in a public location such as a bulletin board. The keyfile generator then encrypts and re-encrypts the keyfile multiple times, using different algorithms. Finally, the keyfile generator signs the keyfile using the vendor's private keying material.

Customer Software

Figure 2:
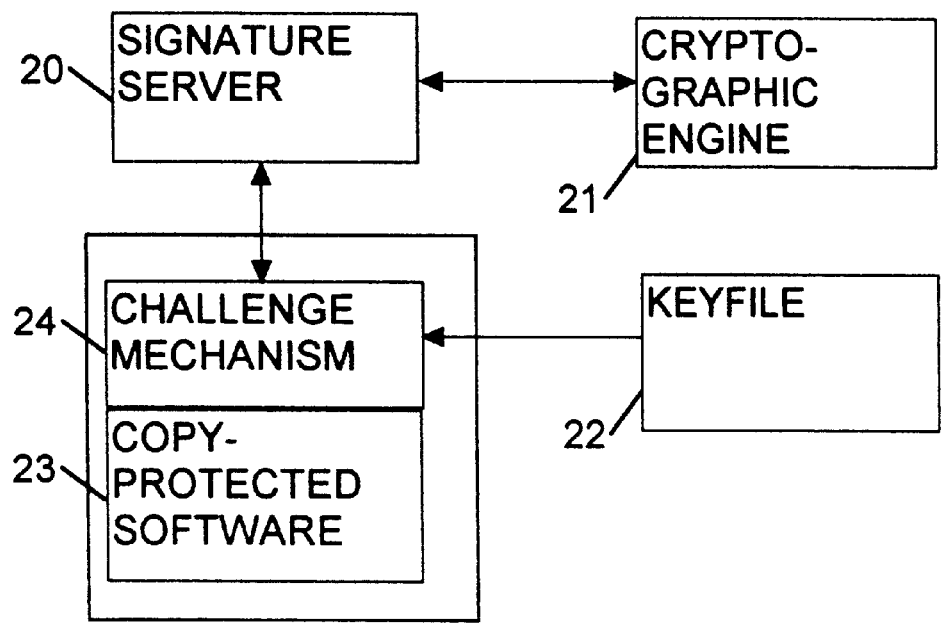
FIG. 2 is a block diagram showing the software components that are required to be installed in the customer's machine to enable the customer to run the copy protected software.

FIG. 2 shows the software components that are required to be installed in the customer's machine (computer) to enable the customer to run the copy protected software. These consist of a signature server 20, and a cryptographic engine 21. Also shown are the keyfile 22 and the copy protected software 23. As mentioned above, the copy protected software includes a challenge mechanism 24.

The signature server is a program that the customer trusts, which the customer executes when the system initially boots. The customer enables the system by inserting a floppy disk that contains an encrypted copy of the customer's private keying material. The signature server then prompts the customer for a pass phrase used to decrypt the floppy. The signature server then executes in the background waiting for signature requests.

It should be noted that the signature server never releases the customer's private keying material out of its process boundary. The signature server relies on operating system protections to ensure its own integrity. The signature server executes in its own address space and communicates with external processes. The signature server stores the customer's password in wired memory (images of the memory never appear in swap space).

The cryptographic engine is a dynamic linked library (DLL) available in both the customer's and the vendor's home country, that performs cryptographic services. The signature server links with the cryptographic engine. Services provided by the cryptographic engine include asymmetric and symmetric encryption and a one-way hash function.

Operation of ECP Mechanism

Figure 3:
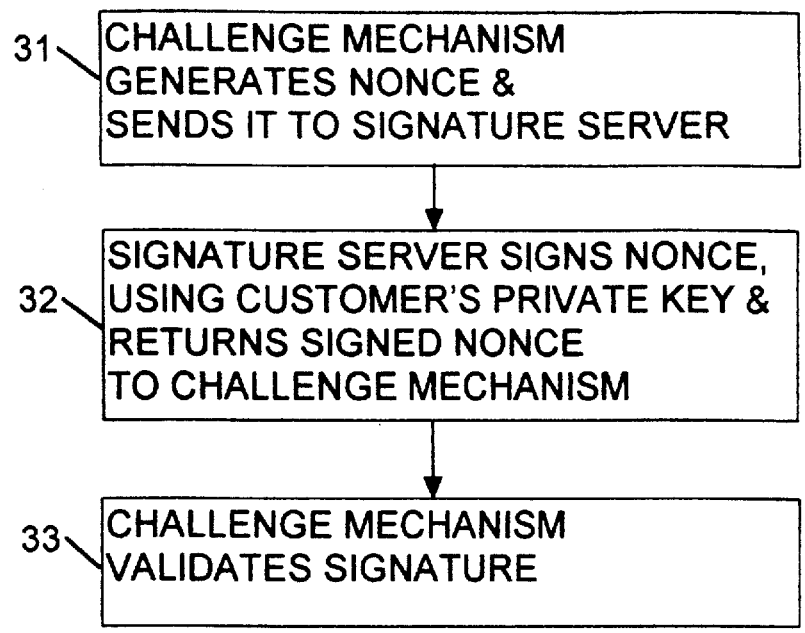
FIG. 3 is a flow diagram showing the operation of the ECP mechanism in the protected software.

FIG. 3 shows the operation of the ECP mechanism. This is performed when the user initially attempts to execute the protected software, and is also repeated periodically during execution.

(Box 31) The challenge mechanism of the protected software generates an unguessable nonce (random number) and passes the nonce to the signature server with a signature request.

Figure 4:
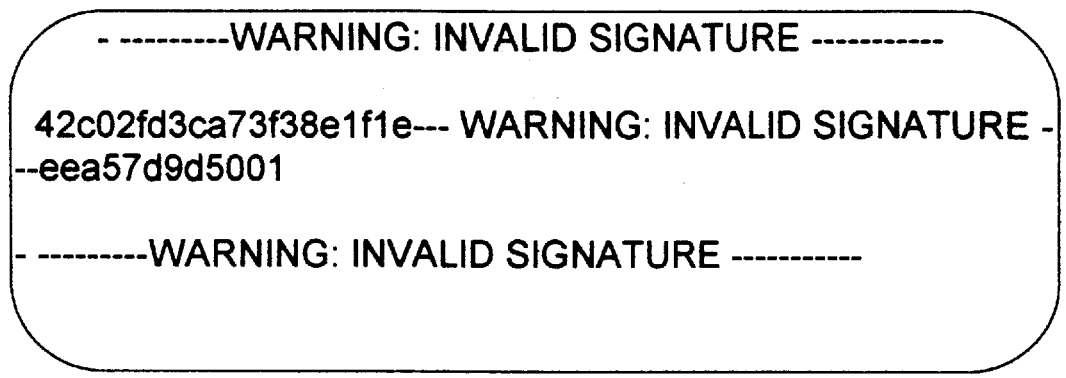
FIG. 4 shows the format of a nonce (random number expressed in hexadecimal form) generated by the ECP mechanism.

(Box 32) When it receives the nonce, the signature server first checks that the nonce presented to it corresponds exactly to the format FIG. 4, with the exception of the 32 random-appearing characters. If it does not, the signature server denies the signature request. Assuming that the nonce is in the correct format, the signature server uses the cryptographic engine to sign the nonce using the customer's private keying material. The signature server then returns the signed nonce to the challenge mechanism in the protected software.

(Box 33) When it receives the signed nonce, the challenge mechanism accesses the keyfile associated with the protected software and calls a signature validation function in the challenge mechanism to validate the vendor's signature of the keyfile, using the vendor's public keying material that is embedded in the challenge mechanism. This validation of the keyfile signature ensures that an attacker cannot modify the keyfile or its digital signature without additionally modifying the challenge mechanism. Vendors may optionally augment this protection using additional proprietary lines of defence. If the keyfile has been modified, the challenge mechanism hangs the program.

Assuming the signature is validated, the challenge mechanism then parses the keyfile, using a proprietary, vendor-specific algorithm, to locate the customer's public keying material in the keyfile, and extracts this public keying material. The challenge mechanism then calls its signature validation function, to validate the digital signature computed over the nonce using the customer's public keying material. If the signature is not valid, the challenge mechanism hangs the program. Thus, it can be seen that the software continues executing if and only if the customer possesses the proper keyfile.

Nonce Generator

Generation of a nonce is performed by a nonce generator included in the challenge mechanism. Operation of the nonce generator is as follows. First, the nonce generator queries a large number of system parameters, e.g., the system time, the amount of space remaining free in the page table, the number of logical disk drives, the names of the files in the operating system's directory, etc.

Figure 5:
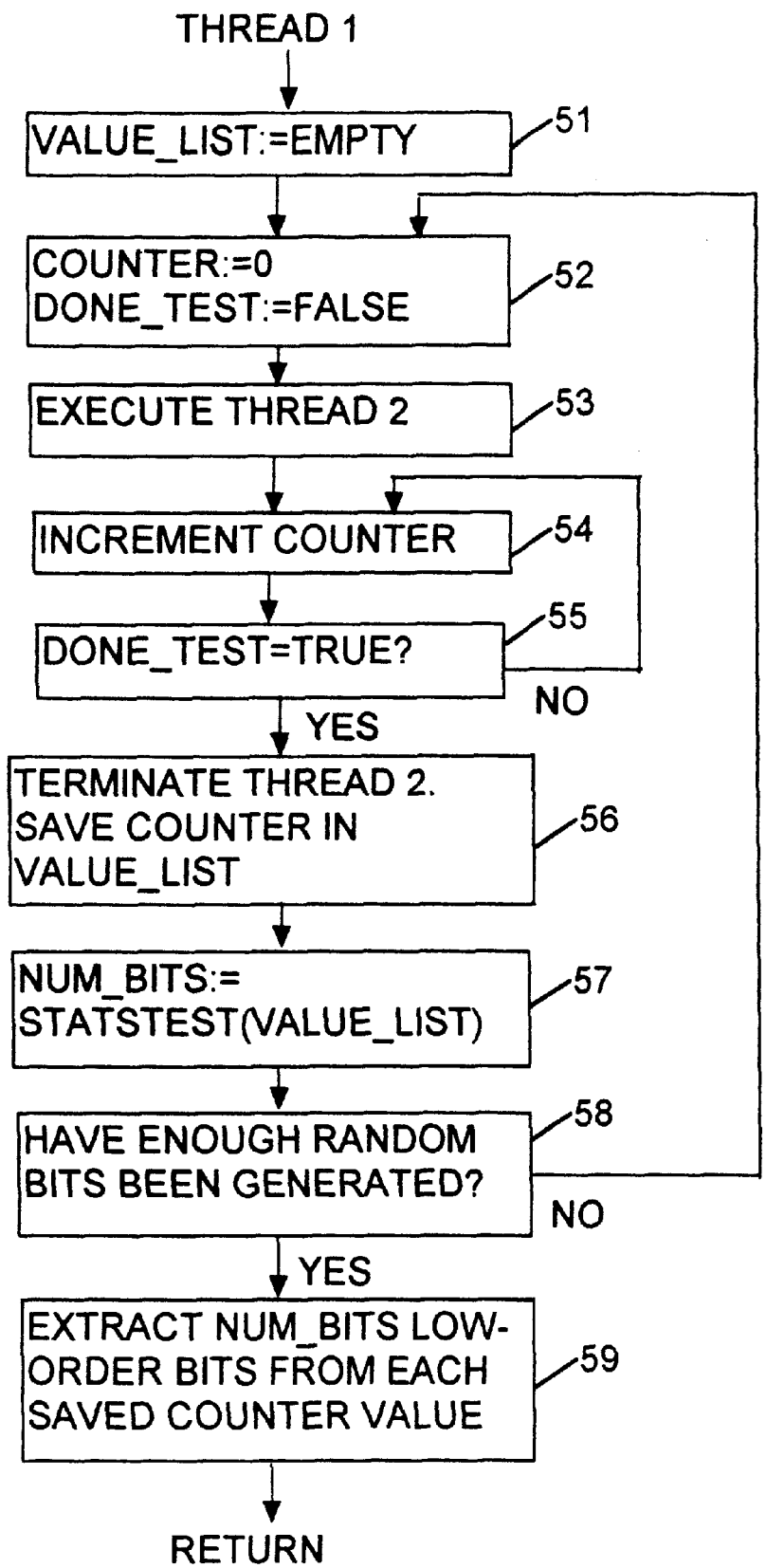
FIG. 5 is a flowchart showing the operation of a random number generator used to generate nonces.

Next, the nonce generator builds a random number, using a random number generator. The random number generator consists of two process threads, referred to herein as Thread 1 and Thread 2. FIG. 5 shows the operation of Thread 1, which is the main thread of the random number generator.

(Box 51) Thread 1 first creates a data structure value_list, for holding a list of counter values. The list is initially empty.

(Box 52) Thread 1 sets a current counter value to zero, and sets a done_test flag to FALSE. (Box 53) Thread 1 then forks Thread 2. Thread 2 posts an asynchronous disk access, and then sleeps until the disk access is complete. When the disk access is complete, Thread 2 sets the done_test flag to TRUE. Note that Thread 1 and Thread 2 share the done_test flag.

(Box 54) Thread 1 increments the counter value by one.

(Box 55) Thread 1 then tests whether the done_test flag is now TRUE, indicating that the disk access initiated by Thread 2 is complete. If done_test is FALSE, the process returns to box 54. Thus it can be seen that, while waiting for the disk access to complete, Thread 1 continually increments the counter value.

(Box 56) When done_test is TRUE, Thread 1 terminates Thread 2, and saves the counter value in the first free location in value_list.

(Box 57) Thread 1 then calls a Statstest function, which estimates the degree of randomness of the counter values saved on value_list. This function may use, for example, the Chi-Square, Kolmogorov-Smirnov, and Serial Correlation Tests. (The Serial Correlation Test is described in D. Knuth, The Art of Computer Programming, Addison-Wesley Publishing Co, Reading Mass., 2nd Edition, 1981). The Statstest function may be optimized to ensure that complicated calculations are not repeated for each disk access. Statstest returns a value which indicates how many low-order bits of each saved counter value should be considered random.

(Box 58) Thread 1 compares the value returned by Statstest when combined with the length of the value_list with a predetermined threshold value, to determine whether enough random bits have now been generated. If not enough random bits have been generated, the process returns to box 52 above, so as to generate and save another counter value.

(Box 59) When the required number of random bits has been generated, Thread 1 extracts the specified number of low-order bits from each counter value in the list, and returns this sequence of bits as the output random number.

In summary, it can be seen that the random number generator exploits the unpredictability in the timing of a series of disk accesses as a source of randomness in the generation of nonces. (See P. Fenstermacher et al., "Cryptographic randomness from air turbulence in disk drives", Advances in Cryptology: Crypto '94, pages 114–120, Springer-Verlag, 1994). By forking new threads on each disk access, the random number generator also exploits unpredictabilities in the operation of the operating system's scheduler as a second source of randomness.

The analysis performed by the Statstest function permits the random number generator to self-tune for any speed processor and disk, by computing the number of low-order bits of each saved counter value to return. For example, a system with a high-variance disk access time will generate more random bits per-disk access than a system with a low-variance disk access time. For example, for a Quantum 1080s disk (6 ms average write time), and a 486 66MHz processor, the system generates approximately 45 bits per second. Alternatively, one may hard code the number of bits per-disk access and use a de-skewing technique to ensure a good degree of randomness.

The nonce generator also queries the operating system to ensure that it posts each disk access to an actual disk. The final output nonce is formed by combining the output random number from the random number generator with the result of querying the system parameters as described above.

The nonce generator described above works best when executing on an operating system that provides direct access to the disk, e.g., Windows 95 or Windows NT. In such an operating system, special operating system calls available to programs executing in user space permit a program to bypass the operating system's in tern a l buffering mechanism and write directly to the disk. Most programs do not take advantage of these special operating system calls because they may be relatively inefficient and difficult to use. On Windows 95 and Windows NT, for example, a program may only use the se special calls if the program accesses data that is a multiple of the disk's sector size. The program may discover the sector size by querying the operating system.

If the operating system does not provide direct access to the disk, then the challenge mechanism could still use the disk timing random number generator. However, in this case, the quality of the generated values would have a greater reliance upon unpredictabilities in the operating system's scheduler as opposed to the variance inherent to the disk access time.

The example of the invention described above assumes that the operating system permits a program to fork multiple threads within a single address space. Additionally, the example of the invention assumes that the operating system permits the threads to access synchronization variables such as semaphores. Most modern operating systems (including Windows 95 and Windows NT) provide these services. The example of the invention uses multiple threads to implement a mechanism which quantifies each disk access time. However, if an implementation of the invention were to execute on a system that does not provide multiple threads or synchronization variables, then the nonce generator could substitute other mechanisms, e.g. querying a physical clock.

Attacks and Defences

The ECP mechanism described above is robust because it protects itself against attack as described below.

1) Disclosed Private Keying Material

In this form of attack, a pirate legitimately purchases the software and then discloses both the software and the pirate's private keying material to an unauthorised user.

The ECP mechanism deters this form of attack because the electronic commerce market provides many incentives for guarding one's private keying material. In order to ensure that a pirate does not generate keying material for the exclusive use of copy protection, the software vendor should consult a CA to ensure that each customer has pre-authorized his or her private keying material to be used for multiple purposes.

The ECP mechanism does not prohibit a customer from maintaining multiple asymmetric key pairs. However, at least one key pair could be used in multiple ways. Perhaps, for example, a software vendor may choose to use the same public keying material both (i) to validate a customer's signature of the electronic transaction used to purchase the software and (ii) to build the customer's keyfile.

2) Certificate Revocation

In this form of attack, immediately after receiving a keyfile from the vendor, the pirate issues a certificate revocation package (CRP). The purpose of the CRP is to announce publicly that the pirate's private keying material has been compromised. Subsequently, the CAs add the pirate's CRP to their certificate revocation lists. The infrastructure encourages electronic commerce participants to disregard any certificate mentioned in a certificate revocation list. At this point the pirate freely distributes his or her private keying material in order to thwart the copy protection mechanism.

The ECP mechanism deters this form of attack because a pirate who wishes to generate a significant profit from breaking ECP has little incentive to mount a CRP attack. The problem is that the pirate probably wishes to remain anonymous in order to avoid legal prosecution. Although the pirate may plead innocence by claiming that someone stole his or her private keying material, the pirate should assume that he or she may be a prime suspect in a potential criminal investigation launched by a law enforcement agency.

A law enforcement investigation might not be a primary concern to a pirate who wishes to generate only a minor profit. However, we hope that the time, trouble, and expense, associated with issuing a CRP outweighs the benefit of circumventing the copy protection for the benefit of only a few close friends.

3) Clandestine Keyfile

In this form of attack, the pirate generates a new public/private keying material pair. Next, the pirate creates a clandestine keyfile that contains the new public keying material. Alternatively, the pirate modifies an original keyfile by substituting the new public keying material. The pirate distributes the copy protected software, the clandestine keyfile, and the new keying material.

The ECP mechanism protects against this type of attack using three lines of defence. The first line of defence is the digital signature of the keyfile, described above. The digital signature ensures that, if a pirate modifies the keyfile, the challenge mechanism does not validate the signature. The pirate may potentially thwart this line of defence by changing the implementation of the challenge mechanism, by substituting a new embedded public key. Such a change to the challenge mechanism breaks an important virus-protection measure that may be used by a legitimate vendor—signing the program in order to ensure that the program is not modified in the distribution process. Note that a vendor does not release its private keying material. This line of defence provides significant keyfile protection because it requires a pirate to disassemble the copy protected program in order to locate the vendor's public keying material.

The second line of defence is the decoy bits in the keyfile. Although the keyfile stores no confidential information, the vendor-specific algorithm for parsing a keyfile is a secret. However, a pirate may potentially learn the secret by disassembling the challenge mechanism's executable image.

The third line of defence is the multiple encryption of the keyfile. If one assumes that the pirate cannot break the encryption algorithms themselves, the pirate must disassemble the copy protected program in order to determine the required cryptographic algorithms.

Of course, no two vendors should use the three lines of defence in exactly the same way. So, if a pirate were able to generate clandestine keyfiles for one version of a program, then the pirate's keyfile-generator would not generate clandestine keyfiles for other vendor's program versions.

4) Repeated Nonces

In this form of attack, the pirate forces the challenge mechanism to generate the same nonce upon each invocation. All of the pirate's customers also force their copy of the challenge mechanism to generate the same nonce. The pirate breaks the copy protection mechanism by freely distributing his or her signature of this special nonce. This attack does not require that the pirate disclose his or her private keying material.

The ECP mechanism implements multiple lines of defence against the repeated nonce attack. The first line of defence is the way in which the challenge mechanism generates an input to the nonce generator by querying a large number of system parameters, as described. This defence is simple but is probably sufficient to thwart the casual pirate. A casual pirate probably would not be willing to trouble him or herself with the difficult procedures required to break this line of defence. For example, the pirate may need to install libraries that spoof the real operating system and fool the challenge mechanism into obtaining the wrong system parameters. In other words, this line of defence assumes that each customer has slightly different system parameters and as a result ensures that no two customers generate the same nonces.

The second line of defence is the sophisticated random number generator as described. However, a sufficiently crafty pirate may potentially install a library that fools both the challenge mechanism and the underlying operating system by substituting a RAM-disk for a real disk. The challenge mechanism protects against this by forking new threads, which has the effect of taking into account unpredictabilities in the operating system's scheduler, as described above.

The third line of defence is the embedded encrypted customer information in the keyfile. The purpose of the encrypted customer information is to permit a software vendor to easily identify the owner of a keyfile in the event that the keyfile appears in a public location such as a bulletin board. Law enforcement agencies may potentially use the customer information in a criminal investigation.

5) Shared Keying Material

In this form of attack, the pirate executes a copy protected program using legitimate keying material. After the copy protected program boots, the pirate reuses the keying material for other purposes on other machines. The pirate never terminates the copy protected program..

The ECP mechanism protects against this form of attack by periodically posting a nonce and then hanging, waiting for a reply, as described.

6) Trojan Horse Propagation

In this form of attack, a pirate vendor distributes a copy protected program that contains an embedded Trojan Horse. The Trojan Horse steals the unsuspecting customer's private keying material and transmits the private keying material back to the pirate vendor. The pirate vendor uses the stolen private keying without the legitimate user's knowledge.

The ECP mechanism defends against this form of attack because, as described above, the signature server never releases the private keying material out of its process boundary. The customer enables the system by inserting a floppy disk that contains an encrypted copy of the customer's private keying material. However, no Trojan Horse software may use the information stored on the floppy disk because the Trojan Horse cannot decrypt the floppy.

7) Networked Signature Server

In this form of attack, a pirate organization establishes a server that signs all nonces. The pirate organization distributes the copy protected software and the keyfile. Additionally, the pirate organization establishes a network connection to its signature server. Each of the pirate's customers executes the program by sending each signature request to the pirate's signature server. Since the keyfile's public key matches the signature produced by the pirate's signature server, the pirate's customers can execute the program.

A pirate who wishes to recoup a significant profit would probably not mount this form of attack. In this case, the pirate would be required to compromise anonymity by widely distributing his or her network address.

A pirate who wishes to recoup only a minor profit has little incentive to mount this form of attack because the cost of operating and maintaining a signature server outweighs the potential benefit of defeating the copy protection mechanism for the benefit of a few close friends. A company, however, may potentially have enough financial incentive to implement a signature server on its private network. In this case, the company defeats the copy protection mechanism by condoning a violation of copyright laws.

8) Signature Server Vulnerability

A pirate may choose to launch an attack on the signature server rather than the copy protection mechanism. Although the signature server signs all randomly generated nonces, the customer does not wish the signature server to grant all such requests. For example, a customer would not wish the signature server to sign a request of the form "Please withdraw funds from my account".

The defence to this attack is that the format of any nonce presented to the signature server must correspond exactly to FIG. 4 with the exception of the 32 random-appearing characters. If a pirate were to remove, for example, any of the three warnings, then the signature server would deny the signature request. If the pirate were to remove any of the warnings of the signed nonce, then the signature would not validate.

Some Possible Modifications

It will be appreciated that many modifications may be made to the system described above without departing from the scope of the present invention.

In particular, a smart card may be used to store the customer's public and private keying material. In such a smart card-enabled configuration, a pirate cannot extract the private keying material from the smart card, which provides even greater defence against attack.

In addition to implementing copy protection, the mechanism described above may be used to trace software pirates. The mechanism provides excellent traceability, without requiring that each customer obtain a unique version of the program.

The signature server, challenge mechanism, and copy protected software described above may be deployed in a number of different configurations. For example:

(i) The signature server, the challenge mechanism, and the copy protected software may all reside in the same address space on a single machine.

(ii) The signature server may reside in one address space and the challenge mechanism and copy protected software may reside in a different address space on a single machine.

(iii) The signature server may reside in an address space on one machine and the challenge mechanism and copy protected software may reside in a different address space on a different machine.

Furthermore, multiple users, each with their own copy of the protected item of software, may share a common signature server, which responds to challenges from all these copies. Another alternative is that multiple users may share common private keying material. A company may use one or more of these deployment options, for example, when constructing multi-user licensing functionality.

In the embodiment described above, the challenge mechanism uses a random number generator to ensure freshness of the protocol. The freshness property ensures that an attacker cannot thwart the system's security guarantees by replaying old messages. Alternatively, different protocols may be used to ensure freshness. For example, in one such alternative protocol, the signature server generates a current timestamp and signs the timestamp. The challenge mechanism validates both freshness of the timestamp and correctness of the signature, and halts execution of the program if a threshold time limit is exceeded without receiving a valid signed timestamp.

In another possible modification, the keyfile may contain hidden information concerning selective activation of services of the copy protected program. For example, the keyfile may specify that the copy protected program may permit execution of a Print service but disable execution of a Save-On-Disk service. As another example, the keyfile may contain an expiration date that describes the last date that a particular service may execute. The copy protected program would read the keyfile to determine the services that the program should execute. A customer could obtain the ability to execute more services by requesting another keyfile from the vendor.

What is claimed is:

1. A computer system comprising a copy protection mechanism for protecting software against unauthorized execution, the copy protection mechanism comprising challenge means associated with a protected item of software, and response means in which a customer's private keying material is securely stored, wherein:

(a) the challenge means has no access to the customer's private keying material, and comprises means for generating a challenge and sending said challenge to the reponse means;

(b) the response means comprises means for signing said challenge using the customer's private keying material and then returning the signed challenge to the challenge means, and (c) the challenge means comprises means for verifying said signed challenge, using the customer's public keying material, and for preventing some or all of said item of software from being executed unless said verification is successful.

2. A computer system according to claim 1 wherein said challenge means comprises means for issuing a random challenge.

3. A computer system according to claim 2 wherein said means for issuing a random challenge includes means for generating a random challenge by repeatedly timing responses to disk accesses.

4. A computer system according to claim 3 wherein said means for generating a random challenge includes means for forking new threads in such a manner as to introduce an additional degree of randomness into said random challenges by exploiting unpredictabilities in the operating system's scheduler.

5. A computer system according to claim 3 wherein said means for generating a random challenge includes means for performing a statistical test to determine the number of random bits obtained by each of said disk accesses, and means for causing said disk accesses to be repeated until a predetermined number of random bits has been obtained.

6. A computer system according to claim 1 wherein said challenge means is embedded in said protected item of software.

7. A computer system according to claim 1 wherein the system includes a keyfile for holding the customer's public keying material.

8. A computer system according to claim 7 wherein the customer's public keying material held in said keyfile is digitally signed, whereby it is computationally infeasible to alter any portion of the keyfile, including the public keying material, without altering the challenge means.

9. A computer system according to claim 8 wherein said keyfile includes information identifying the customer to which the protected item of software has been supplied, to assist in identifying the source of pirate copies of the protected item of software.

10. A computer system according to claim 8 wherein the keyfile includes decoy bits for disguising the customer's public keying material held therein.

11. A computer system according to claim 8 wherein the keyfile includes information concerning selective activation of services of the copy protected program.

12. A computer system according to claim 1, including a plurality of protected items of software, each having its own challenge means, and a single response means, shared between all of said protected items.

13. A method of distributing software to a plurality of customers wherein each customer has a computer system according to claim 1, and wherein every customer receives an identical copy of said copy protected program and of said challenge means.

14. A computer system comprising:

(a) means for inputting a program to be copy-protected, and for embedding a challenge means in that program; and (b) means for inputting a plurality of units of public keying material from a plurality of customers, and for generating, for each of said customers, a keyfile containing that customer's public keying material;

(c) wherein said challenge means comprises means for verifying signed information, using a customer's public keying material held in the relevant keyfile, but without access to the customer's private keying material, and for preventing some or all of said item of software from being executed unless said verification is successful.

15. A computer system according to claim 14 wherein said challenge means further comprises means for issuing a random challenge.

16. A computer system according to claim 15 wherein said means for issuing a random challenge comprises means for generating a random challenge by repeatedly timing responses to disk accesses.

17. A computer system according to claim 16 wherein said means for generating a random challenge includes means for forking new threads in such a manner as to introduce an additional degree of randomness into said random challenges by exploiting unpredictabilities in the operating system's scheduler.

18. A computer system according to claim 16 wherein said means for generating a random challenge includes means for performing a statistical test to determine the number of random bits obtained by each of said disk accesses, and means for causing said disk accesses to be repeated until a predetermined number of random bits has been obtained.

19. A system according to claim 14 wherein the customer's public keying material held in said keyfile is digitally signed, whereby it is computationally infeasible to alter any portion of the keyfile, including the public keying material, without altering the challenge means.

20. A computer system according to claim 19 wherein said keyfile includes information identifying the customer to which the protected item of software has been supplied, to assist in identifying the source of pirate copies of the protected item of software.

21. A system according to claim 19 wherein the keyfile includes decoy bits for disguising the customer's public keying material held therein.

22. A computer system according to claim 19 wherein the keyfile includes information concerning selective activation of services of the copy protected program.

23. A computer system including a random number generator for generating random numbers by timing responses to disk accesses, wherein said random number generator is embedded in a program and runs in that program's address space.

24. A computer system according to claim 23 wherein random number generator includes means for forking new threads in such a manner as to introduce an additional degree of randomness into said random numbers by exploiting unpredictabilities in the operating system's scheduler.

25. A computer system according to claim 23, including means for performing a statistical test to determine the number of random bits obtained by each of said disk accesses, and means for causing said disk accesses to be repeated until a predetermined number of random bits has been obtained.

* * * * *